(12) United States Patent
Huang et al.

(10) Patent No.: US 8,460,591 B2
(45) Date of Patent: Jun. 11, 2013

(54) POROUS MEMBRANES AND METHODS OF MAKING THE SAME

(75) Inventors: Xiaosong Huang, Sterling Heights, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 501 days.

(21) Appl. No.: 12/729,722

(22) Filed: Mar. 23, 2010

(65) Prior Publication Data

US 2011/0236762 A1    Sep. 29, 2011

(51) Int. Cl.
B29C 67/20 (2006.01)

(52) U.S. Cl.
USPC ............................................. 264/216; 264/41

(58) Field of Classification Search
USPC ...................................... 264/41, 216
See application file for complete search history.

(56) References Cited

U.S. PATENT DOCUMENTS

| | | | | |
|---|---|---|---|---|
| 2,120,281 A * | 6/1938 | Hunt | ................................ | 264/41 |
| 4,237,083 A * | 12/1980 | Young et al. | ...................... | 264/41 |
| 4,340,480 A * | 7/1982 | Pall et al. | ........................ | 210/490 |
| 4,375,441 A * | 3/1983 | Adams et al. | ................... | 264/460 |
| 4,620,955 A * | 11/1986 | Kono et al. | ....................... | 264/41 |
| 4,623,463 A * | 11/1986 | Ford et al. | ................. | 210/500.29 |
| 4,791,144 A * | 12/1988 | Nagou et al. | ..................... | 521/90 |
| 4,997,603 A * | 3/1991 | Kafchinski et al. | .............. | 264/49 |
| 5,834,107 A * | 11/1998 | Wang et al. | ................. | 428/310.5 |
| 5,856,426 A * | 1/1999 | Takahashi et al. | ............. | 528/310 |
| 5,945,210 A * | 8/1999 | Senba et al. | ................ | 428/317.9 |
| 6,153,133 A * | 11/2000 | Kaimai et al. | ................... | 264/41 |
| 6,245,272 B1 * | 6/2001 | Takita et al. | ................ | 264/210.4 |
| 6,447,958 B1 * | 9/2002 | Shinohara et al. | ............. | 429/248 |
| 6,537,334 B1 * | 3/2003 | DuPasquier et al. | .......... | 29/623.5 |
| 6,790,404 B2 * | 9/2004 | Yapel et al. | .................... | 264/466 |
| 7,112,389 B1 * | 9/2006 | Arora et al. | .................... | 429/128 |
| 7,399,439 B2 * | 7/2008 | Lee et al. | ........................ | 264/212 |
| 7,439,291 B2 | 10/2008 | Wang et al. | | |
| 7,485,227 B2 | 2/2009 | Kiefer et al. | | |
| 7,560,024 B2 | 7/2009 | Kools et al. | | |
| 7,642,012 B2 | 1/2010 | Djian et al. | | |

(Continued)

FOREIGN PATENT DOCUMENTS

WO    WO 2005/049318    6/2005

OTHER PUBLICATIONS

Xiang et al."Nonsolvent Effect on the Fab of Microporous Polyurethane Membranes by Solvent Induced Phase Inversion",J of Funct Poly,vol. 22,Issue 2,(Jun. 2009),pp. 114-118.

*Primary Examiner* — Christina Johnson
*Assistant Examiner* — Saeed Huda
(74) *Attorney, Agent, or Firm* — Dierker & Associates, P.C.

(57) ABSTRACT

The instant disclosure relates to porous membranes and methods of making the same. An example of the method includes exposing a polymeric film (including a polymer and i) a gel-forming polymer, ii) ceramic particles, or iii) combinations of i and ii) established on a carrier belt to a non-solvent or a slightly miscible solvent of a polymer in the polymeric film, thereby inducing formation of a porous structure in the polymeric film. The method further includes transporting the polymeric film on the carrier belt into a bath of a non-solvent or a slightly miscible solvent of the polymer for a predetermined time thereby finalizing the formation of the porous structure and forming the porous membrane. The porous membrane is removed from the non-solvent or slightly miscible solvent bath.

19 Claims, 7 Drawing Sheets

U.S. PATENT DOCUMENTS

| | | |
|---|---|---|
| 7,866,487 B2 * | 1/2011 | Sueoka et al. ........... 210/500.38 |
| 2004/0161598 A1 * | 8/2004 | Ohno et al. ................ 428/315.7 |
| 2006/0057464 A1 | 3/2006 | Kim et al. |
| 2007/0012617 A1 * | 1/2007 | Suzuki et al. ........... 210/500.27 |
| 2007/0100012 A1 | 5/2007 | Beard |
| 2008/0113177 A1 * | 5/2008 | Sueoka et al. ............. 428/304.4 |
| 2009/0186280 A1 * | 7/2009 | Iidani et al. ................... 429/249 |
| 2009/0233164 A1 | 9/2009 | Shimamura et al. |

* cited by examiner

POROUS MEMBRANES AND METHODS OF MAKING THE SAME

TECHNICAL FIELD

The present disclosure relates generally to porous membranes and methods of making the same.

BACKGROUND

Porous membranes have been developed for use as separators in batteries, such as, for example, lithium ion batteries.

SUMMARY

The instant disclosure relates to porous membranes and methods of making the same. An example of the method includes exposing a polymeric film (including a polymer and i) a gel-forming polymer, ii) ceramic particles, or iii) combinations of i and ii) established on a carrier belt to a non-solvent or a slightly miscible solvent of a polymer in the polymeric film, thereby inducing formation of a porous structure in the polymeric film. The method further includes transporting the polymeric film on the carrier belt into a bath of a non-solvent or a slightly miscible solvent of the polymer for a predetermined time, thereby finalizing the formation of the porous structure and forming the porous membrane. The porous membrane is removed from the non-solvent or slightly miscible solvent bath.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein utilize a modified phase inversion process to form porous membranes having a controlled morphology. In some instances, the morphology is controlled so that the resulting pores of the membrane are substantially uniform (i.e., having the same or similar size). The coefficient of variance of the pore size is less than 100% based on the SEM images provided herein. Generally, and as will be discussed in further detail herein, the porous membrane morphology may be controlled by adjusting materials and/or various parameters used in the method(s).

Figure 1:
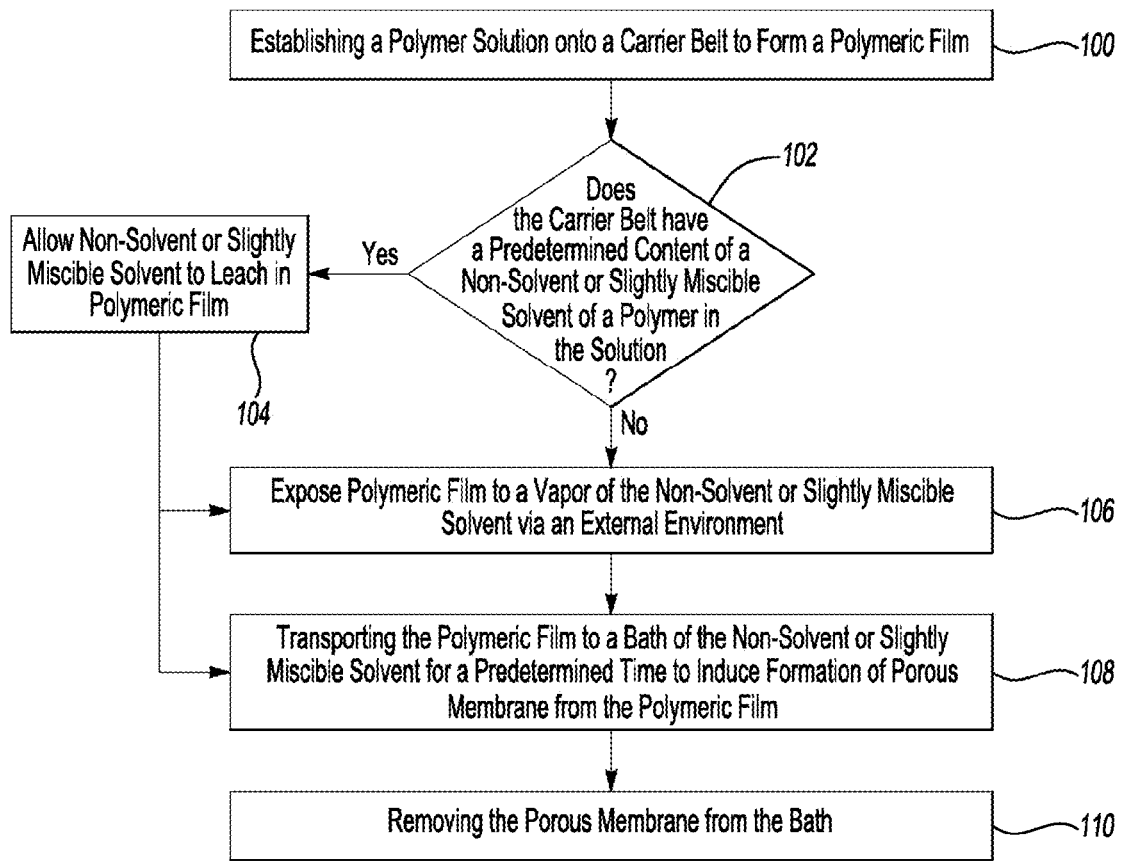
FIG. 1 is a flow diagram depicting various examples of the method for forming porous membranes.
Figure 2:
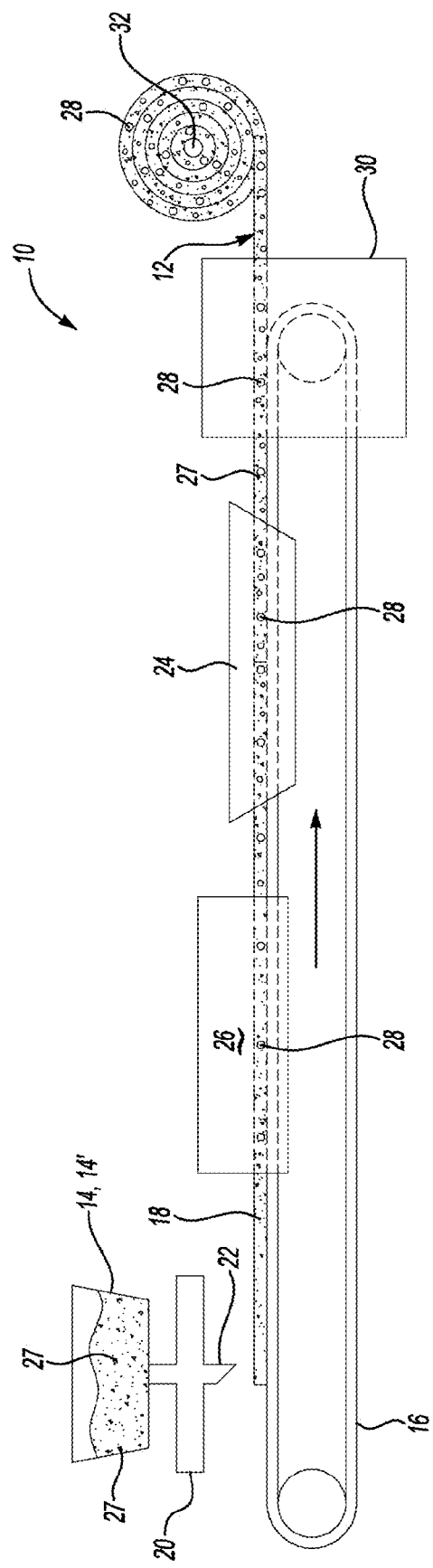
FIG. 2 is a schematic diagram of an example of a system for forming porous membranes.

FIG. 1 depicts a flow diagram of various examples of the method for forming the porous membranes, and FIG. 2 schematically depicts one specific example of a system 10 for forming the porous membranes 12. FIGS. 1 and 2 will now be referred to together in the description of the examples of the method and system 10.

A polymer solution 14 or 14' is established onto a carrier belt 16 to form a polymeric film 18 (as set forth at reference numeral 100 in FIG. 1). Prior to establishing the polymer solution 14, 14' on the carrier belt 16, the polymer solution 14, 14' is either made or purchased. The polymer solution 14, 14' (whether made or purchased) includes at least one polymer dissolved in a solvent (with either another polymer and/or with ceramic particles). The polymer may be one polymer or may be a blend of different polymers.

In examples of the polymer solution 14 which include one polymer, the polymer is selected from poly(ether imide) (PEI), poly(amic acid), polysulfone (PSF), polyphenylsulfone (PPSF), polyethersulfone (PESF), polyamides (e.g., nylon, aramids, etc.), polyvinylidene fluoride (PVDF), polyacrylonitrile (PAN), poly(methyl methacrylate) (PMMA), polyolefins (e.g., polyethylene, polypropylene, etc.), or cellulose acetate. The solvent used depends upon the polymer used, and will be selected so that it dissolves the selected polymer. As non-limiting example, dimethyl sulfoxide (DMSO) may be used as a solvent for at least poly(ether imide), polyvinylidene fluoride, polyacrylonitrile, poly(methyl methacrylate), and polysulfone; formic acid may be used as a solvent for at least polyamides; xylene or toluene may be used as solvents for at least polyolefins; and acetone may be used a solvent for cellulose acetate. Other suitable solvents may include N-methyl-2-pyrrolidone (NMP), N,N- dimethylformamide (DMF), tetrahydrofuran (THF), acetonitrile, or other acids (e.g., acrylic acid, acetic acid, lactic acid, hydrochloric acid, and sulfuric acid).

The amount of polymer dissolved in the solvent ranges from about 5 wt % to about 40 wt % of the total weight percent of the final solution 14.

In examples of the polymer solution 14' which include a blend of polymers, a predetermined ratio of at least one high strength polymer and at least one gel-forming polymer is mixed in a solvent. As used herein, the term "high strength polymer" refers to a polymer having a tensile strength that is equal to or greater than 30 MPa. Some non-limiting examples of high strength polymers include poly(ether imide), polyphenylsulfone, polyethersulfone, polysulfone, polyamides, polyurethanes, and combinations thereof. As used herein, the term "gel-forming polymer" refers to a polymer that can absorb electrolyte solvents and form a gel. The electrolyte solvents will behave as plasticizers in the polymer. Non-limiting examples of gel-forming polymers include polyvinylidene fluoride, polyvinylidene chloride, polyacrylonitrile, poly(methyl methacrylate), poly(ethylene oxide) (PEO), and combinations thereof. The gel-forming polymer is used to change the morphology of the resulting porous membrane 12 and increase its ionic conductivity. It is to be understood that in the blend of polymers, multiple types of high strength polymers may be used and/or multiple types of gel-forming polymers may be used, as long as there is at least one high strength polymer blended with at least one gel-forming polymer.

In the polymer blend solution 14', the predetermined ratio of high strength polymer(s) to gel-forming polymer(s) will depend upon the polymers selected. The ratio of high strength polymer(s) to gel-forming polymer(s) may range anywhere from 1:1 to 20:1 by weight. It is to be understood that any other ratio within this range is within the purview of this disclosure, and the desired ratio depends, at least in part, upon obtaining a balance between the conductivity and the thermal stability. For example, poly(ether imide) may be blended with polyacrylonitrile in a weight ratio of 4:1 to achieve better ionic conductivity, while poly(ether imide) may be blended with polyacrylonitrile in a weight ratio of 8:1 to achieve better thermal stability. As another example, polysulfone may be blended with polyvinylidene fluoride in a weight ratio of 2:1.

Also in the polymer blend solution 14', the solvent selected will depend upon the polymers selected. A non-limiting example of a suitable solvent for both the high strength polymer and the gel-forming polymer includes dimethyl sulfoxide (DMSO), N-methyl-2-pyrrolidone (NMP), and N,N-dimethylformamide (DMF).

In one example when the polymer blend solution 14' is used, the polymers are first respectively dissolved in solvents to form separate solutions, and then a desirable amount of each solution is added together to form the blended solution 14'. When this technique is utilized, the amount of the high strength polymer dissolved in the solvent ranges from about 2 wt % to about 50 wt % of the total weight percent of the first solution; and the amount of gel-forming polymer dissolved in the solvent ranges from about 2 wt % to about 50 wt % of the total weight percent of the second solution. In one non-limiting example, the respective polymers are added to the respective solvents to form respective 20 wt % solutions (i.e., 20 wt % polymer in a solution having a total weight percent of 100). Suitable amounts of each of the first and second solutions are added together to achieve a blended solution 14' having the desired ratio of high strength polymer to gel-forming polymer.

In another example when the polymer blend solution 14' is used, the desired weight ratio of the polymers is added directly to the solvent. As one example, a mixture of poly (ether imide) (PEI) and polyacrylonitrile (PAN) may be made including a ratio of PEI:PAN equal to 5:1 by weight. The blend is dispersed into NMP so that the final solid content in the solution is 20 wt %.

In one example, preparation of the polymer solution 14, 14' includes adding a predetermined amount of ceramic particles (shown as reference numeral 27 in FIG. 2) thereto. Non-limiting examples of suitable particles 27 include silica particles, alumina particles, titania particles, calcium carbonate particles, or combinations thereof. The amount and size (e.g., diameter, length, etc.) of the ceramic particles 27 may be altered depending, at least in part, upon the desirable pore size and ionic conductivity in the final porous membranes 12 (see FIG. 2). In one example, the amount of ceramic particles 27 used ranges from 10 wt % to 90 wt %. The addition of ceramic particles 27 increases the ionic conductivity of the porous membrane 12 and strengthens the pores 28 (see FIG. 2) formed in the membranes 12. When the porous membrane 12 is used in a battery, the ceramic particles 27 may also increase battery abuse tolerance by improving the particle penetration resistance of the membrane 12.

Once the desired polymer solution 14 or the desired polymer blend solution 14' (either of which may also contain the ceramic particles 27) is obtained, the solution 14, 14' is established/applied on the carrier belt 16 (see reference numeral 100 in FIG. 1) to form a polymer film 18. The polymer solution 14, 14' may be applied via a spray process, a casting process, an extrusion process, or an injection/roll compaction process. The thickness of the applied film 18 may be controlled via any suitable mechanism, including a pump and meter 20, a doctor blade 22, or the like, or combinations thereof. In one example, the thickness of the applied film 18 ranges from about 10 microns to about 1 mm.

The carrier belt 16 may include a predetermined content of a non-solvent or a slightly miscible solvent of the polymer(s) in the film 18 (see reference numeral 102 in FIG. 1). As used herein, the term "non-solvent" refers to a substance that, when in liquid form, does not dissolve the polymer(s). Also as used herein, the term "slightly miscible solvent" refers to a substance that, when in liquid form, is absorbed by the polymer(s) when the polymer(s) is/are soaked therein. For a substance to be considered a slightly miscible solvent, the absorption of the liquid by the polymer can be as low as 0.1% by weight. The non-solvent or slightly miscible solvent will depend upon the polymer(s) used, non-limiting examples of which include water, alcohols (e.g., methanol, ethanol, propanol, and butanol), acids (e.g., formic acid, acrylic acid, acetic acid, lactic acid, hydrochloric acid, and sulfuric acid), and N-methyl-2-pyrrolidone. Alcohols and acids may be suitable non-solvents or partially miscible solvents in place of water for many polymers, such as, for example, poly(ether imide) (PEI), polysulfone (PSF), and polyvinylidene fluoride (PVDF).

When present in the carrier belt 16 in liquid and/or vapor form, the non-solvent or slightly miscible solvent is capable of leaching out into the film 18, as shown at reference numeral 104. The non-solvent or slightly miscible solvent from the carrier belt 16 affects the porous structure/morphology of the ultimately formed porous membrane 12. As such, the time for which the film 18 is allowed to sit on the carrier belt 16 (prior to introduction into a bath, discussed further hereinbelow) and/or the predetermined content of the non-solvent or slightly miscible solvent in the carrier belt 16 may be altered depending, at least in part, upon the desired final morphology.

In one example, the carrier belt 16 is substantially flat (i.e., surface roughness is negligible and will not interfere with the formation of the porous membrane 12), and is relatively flexible. The term flexible means that when the belt is bent on the pulleys, no cracks are introduced into the belt.

In one example, the carrier belt 16 is formed of a polymeric material or a metallic material. Non-limiting examples of materials suitable for the carrier belt 16 include hydrophobic materials (e.g., polypropylene, polyethylene, polystyrene, aluminum, copper, steel, etc.) or hydrophilic materials (polyamides, epoxies, cellulose acetate, polyethylene terephthalate (PET), etc.).

As previously mentioned, in order for the non-solvent or slightly miscible solvent to be leached into the film 18, the belt 16 includes at least some of the non-solvent or slightly miscible solvent therein. When a hydrophobic or hydrophilic polymer belt 16 is used, the belt 16 contains some amount of non-solvent or slightly miscible solvent (e.g., water) of the polymer(s), which can be absorbed into the film 18. The belt 16 may also be wetted in order to provide the desirable amount of non-solvent or slightly miscible solvent to the film 18.

When the carrier belt 16 contains a desirable amount of non-solvent or slightly miscible solvent to be absorbed by the film 18, the film 18 may be allowed to sit on the carrier belt 16 for a predetermined time prior to being transported into a coagulation bath 24. This time period may be adjusted, depending upon how much of the non-solvent or slightly miscible solvent is to be leached into the film 18. In one example, the film 18 is allowed to sit on the carrier belt 18 for up to five minutes before it is introduced into the coagulation bath 24.

As shown in FIG. 2, the film 18 is introduced into an external environment 26 having a desirable non-solvent or slightly miscible solvent content in the form of vapor (see also reference numeral 106 in FIG. 1). It is to be understood that exposure to the external environment 26 may be used when the carrier belt 16 does not contain a desirable amount of non-solvent or slightly miscible solvent, or may be used when the belt 16 does have the non-solvent or slightly miscible solvent therein or thereon (see reference numerals 104 and 106 of FIG. 1).

By placing the film 18 in the external environment 26, the film 18 is allowed to be exposed to the non-solvent or the slightly miscible solvent. During the exposure period, at least some of the non-solvent or slightly miscible solvent absorbs into the film 18. The time of exposure may be increased to enable more absorption into the film 18, but is usually stopped before the film 18 becomes saturated with the non-solvent or slightly miscible solvent.

In one non-limiting example, water is used as the non-solvent or the slightly miscible solvent, and thus the external environment 26 is in a chamber having a desirable humidity/moisture level. The humidity level and/or the time for which the film 18 is exposed to the environment 26 may be controlled so that the resulting porous membrane 12 has a desirable morphology. A higher humidity level generally leads to smaller and rounder pores. Increasing the time of exposure enables more absorption into the film 18. The amount of absorbed non-solvent or slightly miscible solvent can affect the phase separation behavior of the film so as to change the film 18 morphology. In one embodiment, the humidity level is maintained at or above 55% relative humidity, and the time of exposure ranges from about 1 second to about 5 minutes. In another embodiment, the humidity level is maintained at about 75% relative humidity. In still another embodiment, the humidity level is up to about 95% relative humidity. However, as previously mentioned, the humidity level and/or exposure time may be varied in order to achieve a different morphology.

The exposure of the film 18 to the non-solvent or the slightly miscible solvent initiates the formation of pores 28. As a result, the film 18 begins to have a porous structure.

After the film 18 is exposed to the non-solvent or slightly miscible solvent (either via the belt 16 and/or the external environment 26), the film 18 is transported into a bath 24 of the non-solvent or slightly miscible solvent, as shown at reference numeral 108. As previously mentioned, in some instances, the time period between exposure and entering the bath 24 is immediate (e.g., 10 seconds or less), and in other instances, the time period is longer.

It is to be understood (as shown in FIG. 2) that the carrier belt 16 is configured to deliver the film 18 into the non-solvent or slightly miscible solvent bath 24. When exposed to the contents of the bath 24, the film 18 absorbs the non-solvent or slightly miscible solvent. The non-solvent or slightly miscible solvent selected for the bath 24 will depend upon the polymer(s) in the film 18. In one non-limiting example, the non-solvent or slightly miscible solvent in the bath 24 is water, ethanol, or N-methyl-2-pyrrolidone (NMP). The film 18 may be exposed to the bath 24 for any suitable time period to induce phase inversion. In one embodiment, the film 18 remains in the bath 24 for a time ranging from about 1 second to about 30 minutes. The temperature of the bath 24 may be room temperature (e.g., 20° C. to 25° C.) or higher (e.g., 30° C. to 90° C.).

While soaking in the bath 24, pores 28 continue to form in the film 18, thereby finalizing the formation of the porous structure and generating the porous membrane 12. The porous membrane 12 is removed from the bath 24 (see reference numeral 110 in FIG. 1), and then may be dried at elevated temperatures in an oven or other drying chamber 30. Suitable drying temperatures range from about 60° C. to about 140° C. The time for drying is at least about 5 minutes and generally does not exceed 48 hours. It may be desirable to fully dry the membrane 12 before winding it via a suitable collecting means 32.

The resulting membrane 12 may have a thin skin (e.g., less than 3 microns, not shown) thereon, which increases the electrical resistance when used as a separator in a battery. It is to be understood that the membrane 12 may be stretched to further increase the porosity in the skin.

It is to be understood that the various steps may be performing using a moving carrier belt 16 so that the process is continuous.

In the examples described herein some specific polymer/solvent/non-solvent systems include polyamide/formic acid/water, polyolefin/xylene or toluene/NMP, and cellulose acetate/acetone/water.

Figure 3:
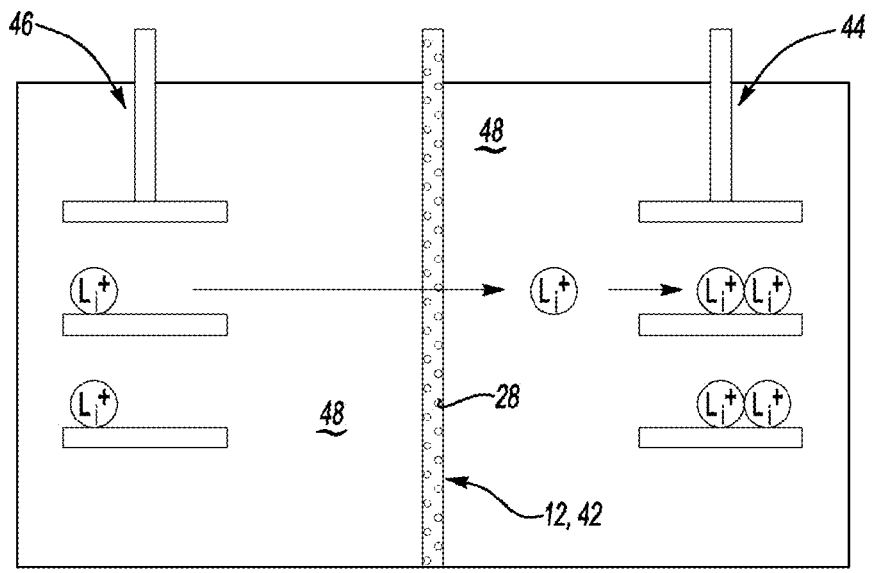
FIG. 3 is a schematic diagram of an example of a battery including an example of the porous membrane as a separator.

Referring now to FIG. 3, an example of a lithium ion battery 40 including the porous membrane 12 as a separator 42 is schematically depicted. The separator 42 separates the positive electrode (cathode) 44 from the negative electrode (anode) 46 while allowing ions to pass therethrough. The cathode 44, separator 42, and anode 46 may be in the form of thin sheets that are submerged in a liquid electrolyte 48. An example of the cathode 44 is a lithium cobalt oxide electrode, an example of the anode 46 is a graphite electrode, and an example of the electrolyte 48 is lithium hexafluorophosphate dissolved in a mixture of propylene carbonate, ethylene carbonate and dimethyl carbonate.

Since the porous membranes 12 disclosed herein are formed with polymer(s) having relatively high glass transition and melt temperatures, the porous membranes 12 can maintain their shape (and porous structure) at temperatures above 150° C. This may be particularly desirable for the battery 40 shown in FIG. 3, at least in part because such stability reduces the risk of internal shorting.

It is to be understood that any of the ranges provided herein include the stated range and any value or sub-range within the stated range. For example, a weight percent of approximately 1 wt % to about 20 wt % should be interpreted to include not only the explicitly recited weight percent limits of 1 wt % to about 20 wt %, but also to include individual weight percentages, such as 2 wt %, 3 wt %, 4 wt %, etc., and sub-ranges, such as 5 wt % to 15 wt %, 10 wt % to 20 wt %, etc.

To further illustrate the examples disclosed herein, the following examples are given. It is to be understood that these examples are provided for illustrative purposes and are not to be construed as limiting the scope of the present disclosure.

EXAMPLES

Various examples of the porous membranes disclosed herein were made and tested. FIGS. 4 through 11 illustrate scanning electron micrographs (SEMs) of the various porous membranes.

Figure 4:
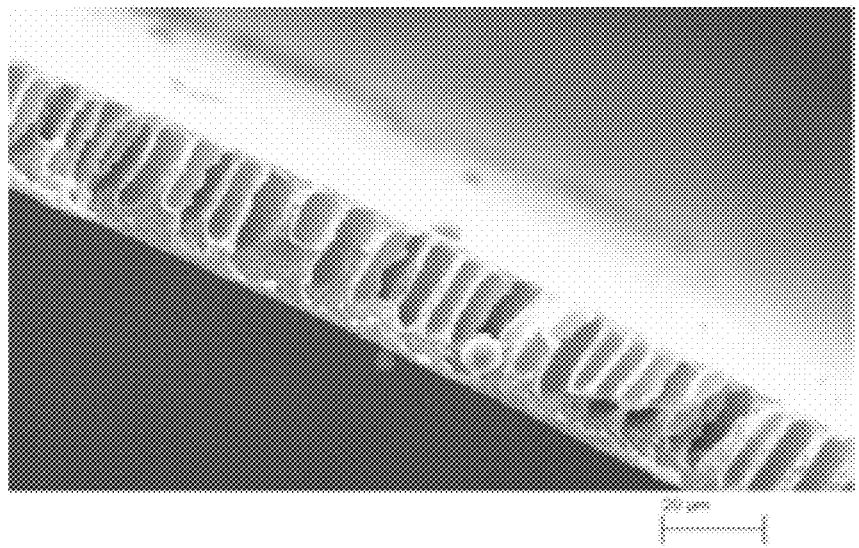
FIG. 4 is a scanning electron micrograph (SEM) image of a porous membrane formed via casting a polymer solution onto a polyethylene belt and transferring the cast solution immediately into a water bath.

FIG. 4 illustrates an example (Comparative Example 1) of the porous membrane formed with a 20 wt % poly(ether imide) (PEI) solution. The solution contained 20 wt % PEI dissolved in dimethyl sulfoxide (DMSO). The solution was cast on a polyethylene carrier belt and was delivered immediately (in 10 seconds or less) into a water bath. As illustrated, in this example, finger-like macro-pores are obtained.

Figure 5:
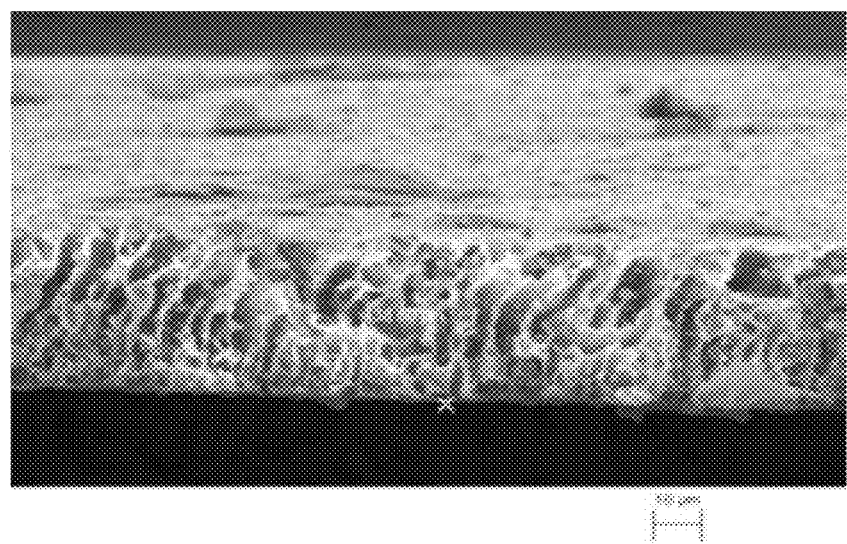
FIG. 5 is a SEM image of a porous membrane formed via casting a polymer solution containing ceramic particles onto a polyethylene belt and transferring the cast solution immediately into a water bath.

FIG. 5 illustrates an example (Comparative Example 2) of the porous membrane formed with solution prepared by dispersing 5 grams of PEI and 10 grams of silica particles in 20 grams of DMSO. The solution was cast on a polyethylene carrier belt and was delivered immediately (in 10 seconds or less) into a water bath. As illustrated, in this example, coarse finger-like macro-pores are obtained.

Figure 6:
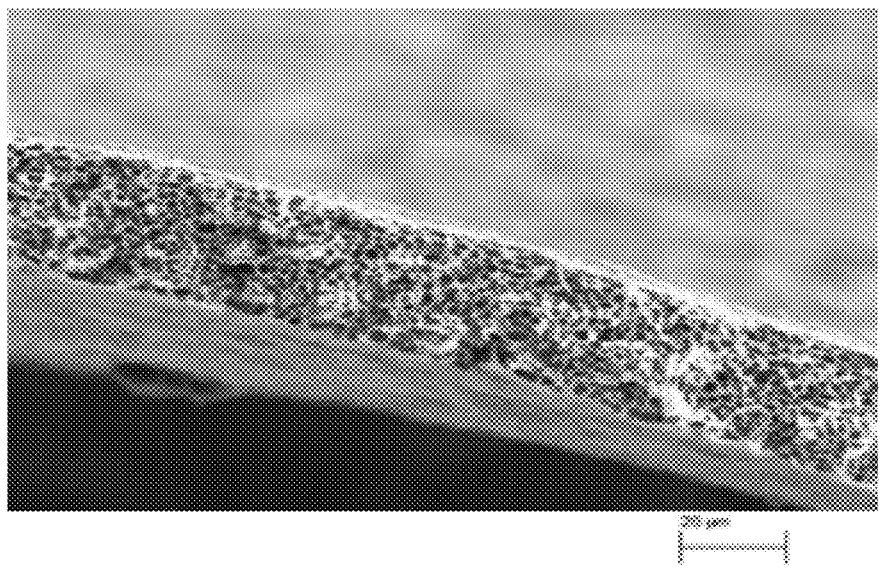
FIG. 6 is a SEM image of a porous membrane formed via casting a polymer solution onto a polyethylene belt, maintaining the cast solution in a humid environment for 1 minute, and then transferring the cast solution into a water bath.

FIG. 6 illustrates another example (Comparative Example 3) of the porous membrane formed with a 20 wt % PEI solution. The solution contained 20 wt % PEI dissolved in DMSO. The solution was cast on a polyethylene carrier belt and was kept in a humidity chamber (having 55% relative humidity) for 1 minute before it was delivered into a water bath.

The ionic conductivities of Comparative Examples 1 through 3 were tested. The respective membranes were saturated with a liquid electrolyte and the conductivity was measured. The conductivity of the liquid electrolyte alone was also measured. $N_M$ is the ratio of the conductivity of the liquid electrolyte to the conductivity of the membrane when saturated with the same liquid electrolyte. $N_M$ is a measure of the reduction in the conductivity when a membrane is applied. In these examples, the electrolyte was LiPF6 (lithium hexafluorophosphate) dissolved in a mixture of EC (ethylene carbonate), EMC (ethyl methyl carbonate) and DMC (dimethyl carbonate). EC, EMC and DMC were mixed in a ratio of 1:1:1 by volume. The concentration of the electrolyte was 1 mol/L. The conductivity of the electrolyte solution (without any membranes) was 6.1 ms/cm. The ratios ($N_M$) are shown in Table 1.

TABLE 1

| Membrane | $N_M$ |
| --- | --- |
| Comparative Example 1 | 9.8 |
| Comparative Example 2 | 6.5 |
| Comparative Example 3 | 34.8 |

A high $N_M$ value means a lower conductivity. As illustrated in Table 1, Comparative Examples 1 and 2 have $N_M$ less than 10, which means their conductivities are high. However, these membranes have larges pores (see FIGS. 4 and 5), and therefore, dendrites can penetrate the membranes relatively easily. In contrast, Comparative Example 3 has smaller pores (see FIG. 6). Therefore, this membrane can provide dendrite penetration resistance. However, the ionic conductivity of this Example is not high. It is desirable to have both good conductivity ($N_M$ less than 10) and small pores.

Figure 7:
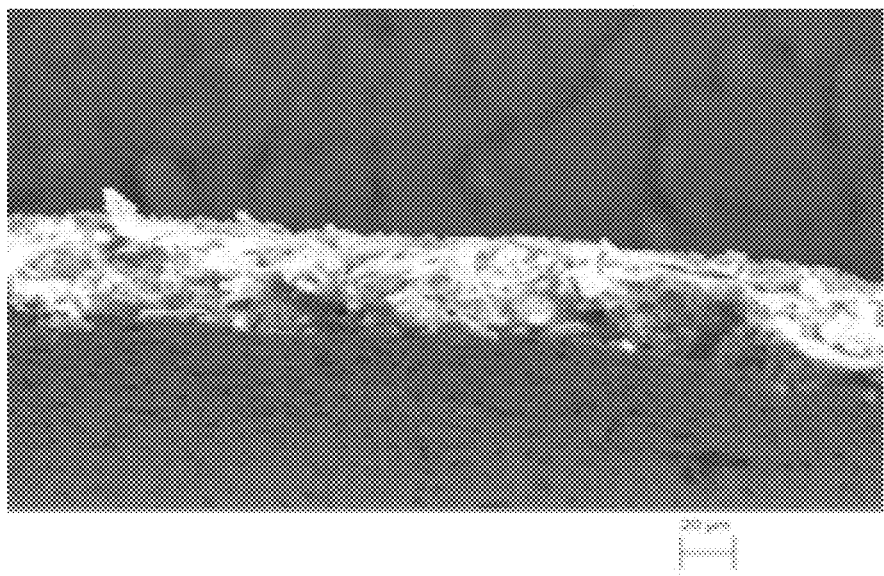
FIG. 7 is a SEM image of a porous membrane formed via casting a polymer solution containing ceramic particles onto a polyethylene belt, maintaining the cast solution in a humid environment for 1 minute, and then transferring the cast solution into a water bath.

FIG. 7 illustrates another example (Example 4) of the porous membrane formed with a solution prepared by dispersing 5 grams of PEI and 10 grams of silica particles in 20 grams of DMSO. The solution was cast on a polyethylene carrier belt and was kept in a humidity chamber (having 55% relative humidity) for 1 minute before it was delivered into a water bath.

Figure 8:
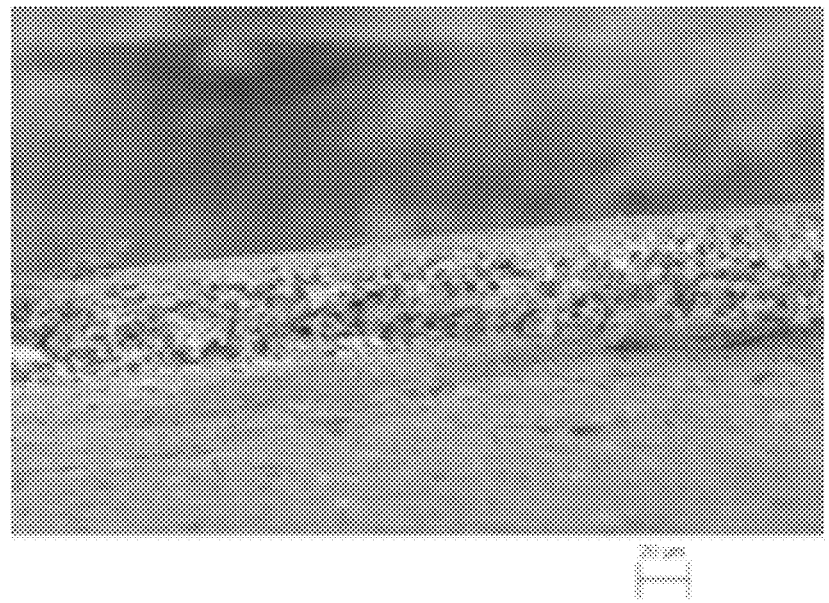
FIG. 8 is a SEM image of a porous membrane formed via casting a polymer blend solution onto a polyethylene belt, maintaining the cast solution in a humid environment for 20 seconds, and then transferring the cast solution into a water bath.

FIG. 8 illustrates still another example (Example 5) of a porous membrane formed with a blend solution. The blend solution was prepared by dispersing 4 grams of PEI and 1 gram of PAN in 20 grams of DMSO. The solution was cast on a polyethylene carrier belt and was kept in a humidity chamber (having 90% relative humidity) for 20 seconds before it was delivered into a water bath. As illustrated, in this example, smaller, relatively uniform pores are obtained.

Figure 10:
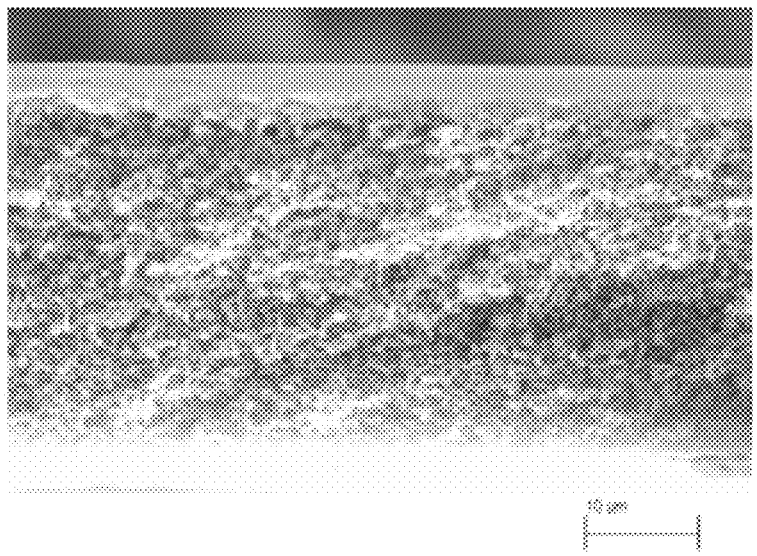
FIG. 10 is a SEM image of a porous membrane formed via casting a polymer blend solution onto an epoxy coated aluminum carrier belt, maintaining the cast solution on the belt for 1 minute, and then transferring the cast solution into a water bath.

FIG. 10 illustrates another example (Example 6) of a porous membrane formed with a blend solution. The blend solution was prepared by dispersing 4 grams of PEI and 1 gram of PAN in 20 grams of DMSO. The solution was cast on an epoxy coated aluminum carrier belt. The epoxy coating was partially crosslinked. The epoxy coating contained 5-10 wt % of water. The blend solution was kept on the belt for 1 minute before it was delivered into a water bath. As illustrated, in this example, smaller, relatively uniform pores are obtained.

Figure 11:
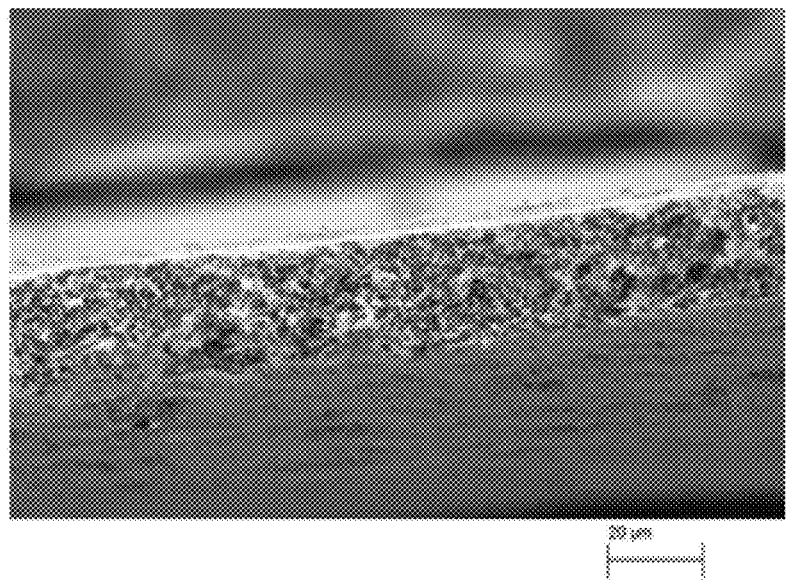
FIG. 11 is a SEM image of a porous membrane formed via casting a polymer blend solution onto an epoxy coated aluminum carrier belt, maintaining the cast solution in a humid environment for 20 seconds, and then transferring the cast solution into a water bath.

FIG. 11 illustrates another example (Example 7) of a porous membrane formed with a blend solution. The blend solution was prepared by dispersing 4 grams of PEI and 1 gram of PAN in 20 grams of DMSO. The solution was cast on an epoxy coated aluminum carrier belt. The epoxy coating was partially crosslinked. The epoxy coating contained 5-10 wt % of water. The blend solution was kept in a humidity chamber (having 90% relative humidity) for 20 seconds before it was delivered into a water bath. As illustrated, in this example, smaller, relatively uniform pores are obtained.

Figure 9:
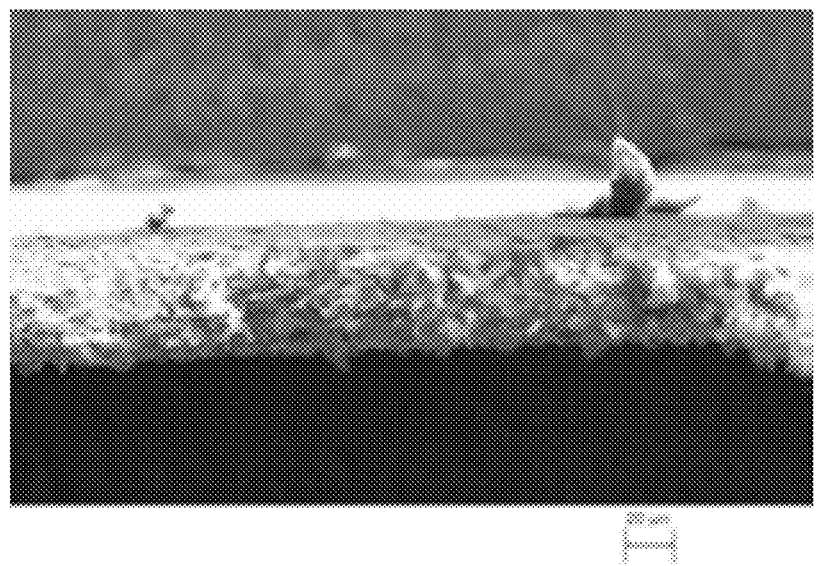
FIG. 9 is a SEM image of a porous membrane formed via casting a polymer blend solution containing ceramic particles onto a polyethylene belt, maintaining the cast solution in a humid environment for 20 seconds, and then transferring the cast solution into a water bath.

FIG. 9 illustrates still another example (Example 8) of a porous membrane formed with a blend solution. This blended solution was prepared by dispersing 4 grams of PEI, 1 gram of PAN, and 10 grams of silica particles in 20 grams of DMSO. The solution was cast on a polyethylene carrier belt and was kept in a humidity chamber (having 90% relative humidity) for 20 seconds before it was delivered into a water bath. As shown in FIG. 9, the pores are small (less than 1 micron in average diameter) and uniform.

The ionic conductivities of Examples 4-8 were also tested in the same manner as the ionic conductivities for Comparative Examples 1-3. The ratios ($N_M$) are shown in Table 2.

TABLE 2

| Membrane | $N_M$ |
|---|---|
| Example 4 | 15.5 |
| Example 5 | 26.0 |
| Example 6 | 25.4 |
| Example 7 | 19.1 |
| Example 8 | 8.1 |

The results in Tables 1 and 2 indicate that when the humidity chamber is used, the pores are generally smaller and have a small size distribution (see Comparative Example 1 vs. Comparative Example 3). However, the pores in Comparative Example 3 are also closed, which would reduce the ionic conductivity of the membrane (see Table 1). The addition of ceramic particles can open pores to increase the conductivity (see Example 4 vs. Comparative Example 3). The addition of a gel polymer can also reduce the pore size and open pores to increase the conductivity (see Examples 5-7 vs. Comparative Example 3). As illustrated in these Examples, a membrane having overall desirable conductivity and pore morphology can be obtained by adding both a gel polymer and ceramic particles (see Example 8).

The dimensional stability of Comparative Examples 1-3 and Examples 4-8 was tested at an elevated temperature of 140° C. for about 1 hour. This was a hot oven test. The membranes were cut into a square of 2 inches by 2 inches. The square samples were kept in the oven at a temperature of 140° C. The size of the samples was measured again after 1 hour. The sample shrinkage is then calculated based on the original sample size. The longitudinal shrinkage and transverse shrinkage for each Comparative Example and Example are shown in Table 3. A control membrane (i.e., Celgard 2500) was tested for comparative purposes. The control Celgard membrane showed a large shrinkage in the longitudinal direction (or machine direction) since it is stretched in this direction during manufacturing.

TABLE 3

| Membrane | Longitudinal Shrinkage (%) | Transverse Shrinkage (%) |
|---|---|---|
| Comparative Example 1 | 4.0 | −0.1 |
| Comparative Example 2 | −0.5 | 1.0 |
| Comparative Example 3 | 0.9 | −0.6 |
| Example 4 | −0.4 | 1.0 |
| Example 5 | 0.2 | 0.5 |
| Example 6 | −0.3 | 0.6 |
| Example 7 | −1.0 | 0.1 |
| Example 8 | 0.3 | −1.2 |
| Control | 27.8 | 1.1 |

Figure 12:
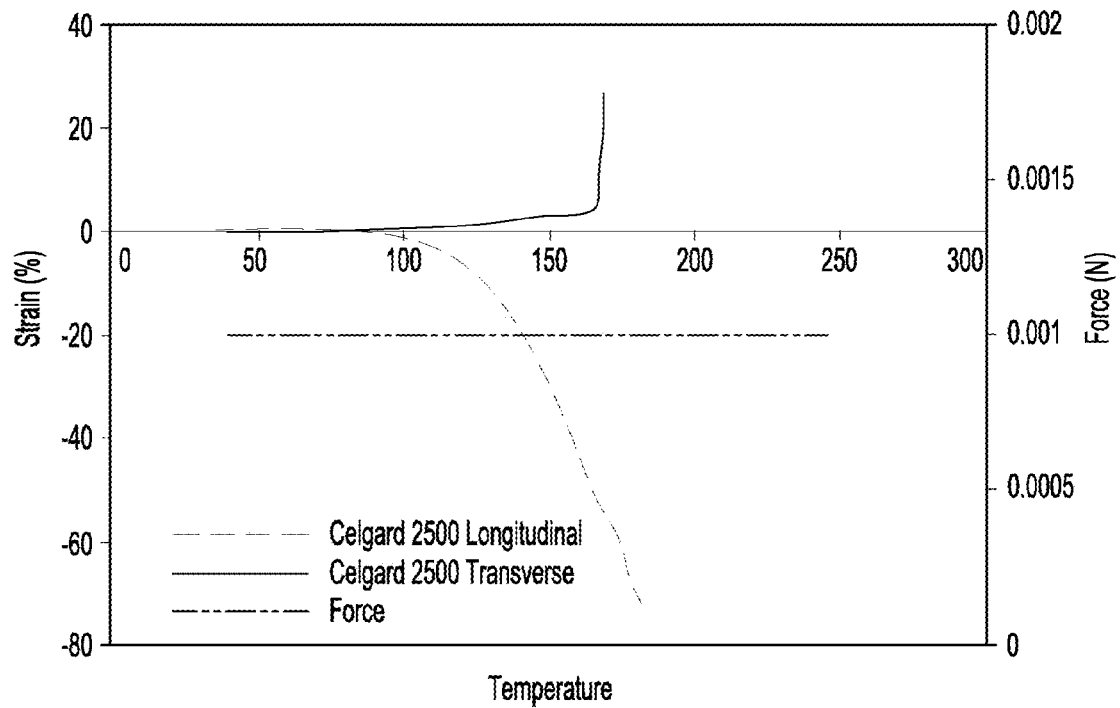
FIG. 12 is a graph illustrating the dimensional stability of a control sample at elevated temperatures.
Figure 13:
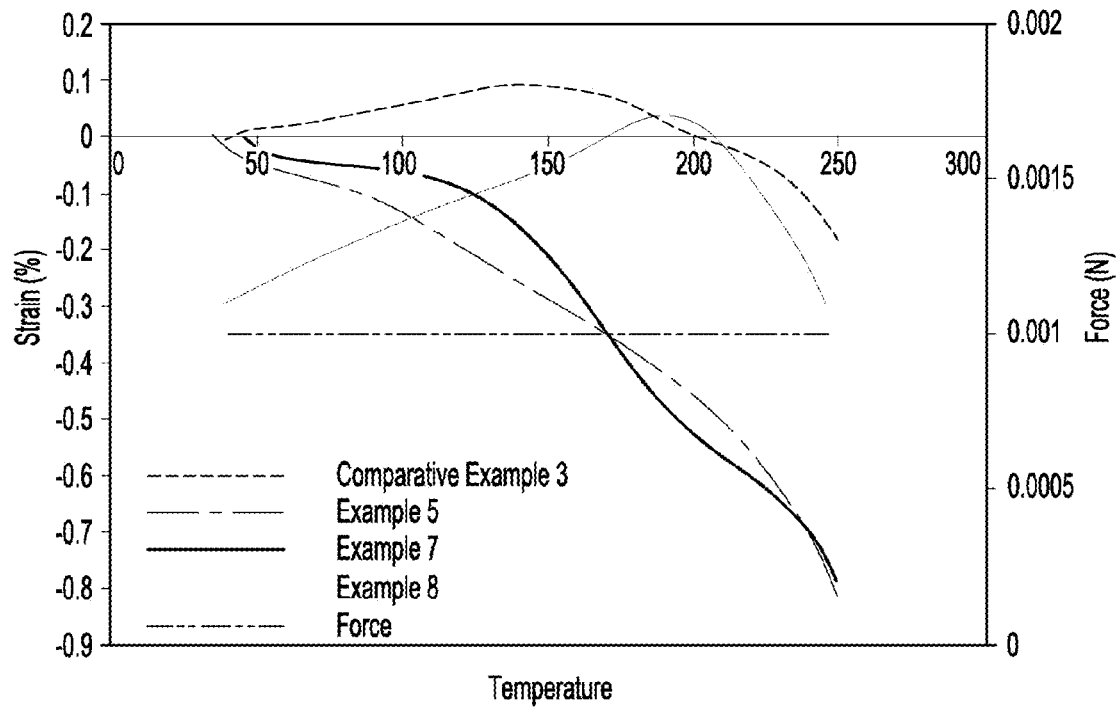
FIG. 13 is a graph illustrating the dimensional stability of various porous membranes at elevated temperatures.

FIGS. 12 and 13 are graphs illustrating the dimensional stability of a control Celgard film (see FIG. 12) and Comparative Example 3 and Examples 5, 7, and 8 (see FIG. 13) at elevated temperatures. These tests were conducted using a Dynamic mechanical analyzer (DMA). The film samples were applied with a constant load (F=0.001 N) while subjected to a temperature sweep from room temperature to 250° C. The dimensional change was recorded to show the thermal shrinkage of the samples. The control Celgard film showed a large shrinkage in the longitudinal direction while in the transverse direction, the sample broke at about 165° C. The shrinkage of the other examples is negligible when compared to the control Celgard film (note the difference in the strain (%) scale in FIGS. 12 and 13). Furthermore, the shrinkage exhibited by Comparative Example 3 and Examples 5, 7, and 8 were within the range of experimental error.

For battery separators, it is generally desirable that the membrane pores be small, uniform, and open. As illustrated herein, when humidity chamber is used, the pores are generally smaller and have a small size distribution. However, the pores are closed, which reduces the ionic conductivity. The addition of a gel polymer advantageously reduces the pore size distribution and opens pores to increase the conductivity. The addition of ceramic particles (in place of or in addition to the gel polymer) also advantageously reduces the pore size distribution, improves the penetration resistance, and opens pores to increase the conductivity.

While several examples have been described in detail, it will be apparent to those skilled in the art that the disclosed examples may be modified. Therefore, the foregoing description is to be considered exemplary rather than limiting.

The invention claimed is:

1. A method for making a porous membrane, comprising:
exposing a polymeric film established on a carrier belt to a non-solvent or a slightly miscible solvent of a polymer in the polymeric film, thereby inducing formation of a porous structure in the polymeric film, the polymeric film including a polymer and i) a gel-forming polymer, ii) ceramic particles, or iii) combinations of i and ii, the exposing including:
selecting the carrier belt such that it has a predetermined non-solvent or slightly miscible solvent content; and
establishing a polymer solution onto the carrier belt to form the polymeric film, whereby the non-solvent or slightly miscible solvent leaches into the polymeric film;
transporting the polymeric film on the carrier belt into a bath of a non-solvent or a slightly miscible solvent of the polymer for a predetermined time, thereby finalizing the formation of the porous structure and forming the porous membrane; and
removing the porous membrane from the non-solvent or slightly miscible solvent bath.

2. The method as defined in claim 1 wherein the transporting of the polymeric film occurs within ten seconds of the establishing of the polymer solution onto the carrier belt.

3. The method as defined in claim 1 wherein the establishing of the polymer solution onto the carrier belt is accomplished via a spray process, a casting process, an extrusion process, or an injection/roll compaction process.

4. The method as defined in claim 1, further comprising adding the ceramic particles to the polymer solution prior to the polymer solution being established on the carrier belt.

5. The method as defined in claim 4, further comprising selecting the particles from silica, alumina, titania, calcium carbonate, and combinations thereof.

6. The method as defined in claim 1, further comprising controlling a morphology of the porous membrane by altering at least one of i) an amount of the non-solvent or the slightly miscible solvent present in or on the carrier belt, or ii) a time period for the exposing, or iii) a combination of i and ii.

7. The method as defined in claim 1 wherein the carrier belt is a polymeric material or a metallic material.

8. The method as defined in claim 1 wherein the carrier belt is a hydrophobic material selected from polyethylene, polypropylene, polystyrene, aluminum, copper, and steel; or is a hydrophilic material selected from polyamides, epoxies, polyethylene terephthalate, and cellulose acetate.

9. The method as defined in claim 1, further comprising moving the carrier belt so that the exposing, the transporting, and the removing are performed continuously.

10. The method as defined in claim 1 wherein the polymer solution includes the polymer and a solvent, and wherein the solvent is selected from the group consisting of dimethyl sulfoxide, N-methyl-2-pyrrolidone, N,N-dimethylformamide, tetrahydrofuran, acetonitrile, acids, xylene, toluene, and acetone, and wherein the non-solvent is selected from water, alcohols, acids, and N-Methyl-2-Pyrrolidone.

11. The method as defined in claim 1 wherein the polymer solution includes a polymer blend, and wherein prior to the exposing, the method further comprises:
    mixing a predetermined ratio of a first solution including a predetermined amount of the polymer, which has a tensile strength equal to or greater than 30 MPa, and a second solution including a predetermined amount of the gel-forming polymer to form the polymer blend.

12. The method as defined in claim 11 wherein the polymer having the tensile strength equal to or greater than 30 MPa is poly(ether imide) and the gel-forming polymer is a polyacrylonitrile; or wherein the polymer having the tensile strength equal to or greater than 30 MPa is polysulfone and the gel-forming polymer is polyvinylidene fluoride.

13. A method for making a porous membrane, comprising:
    mixing a predetermined ratio of a first solution including a predetermined amount of a polymer which has a tensile strength equal to or greater than 30 MPa and a second solution including a predetermined amount of a gel-forming polymer to form a polymer blend;
    establishing the polymer blend on a carrier belt to form a polymeric film;
    exposing the polymeric film established on the carrier belt to a non-solvent or a slightly miscible solvent of the polymer in the polymeric film, thereby inducing formation of a porous structure in the polymeric film;
    transporting the polymeric film on the carrier belt into a bath of a non-solvent or a slightly miscible solvent of the polymer for a predetermined time, thereby finalizing the formation of the porous structure and forming the porous membrane; and
    removing the porous membrane from the non-solvent or slightly miscible solvent bath;
    wherein the polymer having the tensile strength equal to or greater than 30 MPa is poly(ether imide) and the gel-forming polymer is polyacrylonitrile, wherein the first and second solutions each include 20 wt % of the respective polymers, and wherein the mixing includes mixing the first solution and the second solution in a weight ratio of 4:1 or 8:1.

14. The method as defined in claim 12 wherein the polymer having the tensile strength equal to or greater than 30 MPa is polysulfone and the gel-forming polymer is polyvinylidene fluoride, wherein the first and second solutions each include 20 wt % of the respective polymers, and wherein the mixing includes mixing the first solution and the second solution in a weight ratio of 2:1, or 4:1, or 8:1.

15. The method as defined in claim 11 wherein the polymer having the tensile strength equal to or greater than 30 MPa is selected from poly(ether imide), polyamides, polyurethanes, polyphenylsulfone, polyethersulfone, polysulfone, and combinations thereof and wherein the gel-forming polymer is selected from polyvinylidene chloride, polyvinylidene fluoride, polyacrylonitrile, poly(methyl methacrylate), poly(ethylene oxide) and combinations thereof.

16. A method for making a porous membrane, comprising:
    preparing a polymer solution including a polymer and ceramic particles;
    applying the polymer solution on a carrier belt to form a polymeric film;
    exposing the polymeric film established on the carrier belt to a non-solvent or a slightly miscible solvent of the polymer in the polymeric film, thereby inducing formation of a porous structure in the polymeric film;
    transporting the polymeric film on the carrier belt into a bath of a non-solvent or a slightly miscible solvent of the polymer for a predetermined time, thereby finalizing the formation of the porous structure and forming the porous membrane; and
    removing the porous membrane from the non-solvent or slightly miscible solvent bath.

17. The method as defined in claim 16, further comprising selecting the particles from silica, alumina, titania, calcium carbonate, and combinations thereof.

18. The method as defined in claim 16 wherein exposing the polymeric film to the non-solvent or the slightly miscible solvent comprises exposing the polymeric film to a humid environment including a vapor of the non-solvent or slightly miscible solvent in a humidity chamber for a predetermined time before transporting the polymeric film into the non-solvent or slightly miscible solvent bath.

19. The method as defined in claim 16, further comprising:
    selecting the carrier belt such that it has a predetermined non-solvent or slightly miscible solvent content; and
    wherein exposing includes allowing the non-solvent or slightly miscible solvent to leach into the polymeric film.

* * * * *